US010621990B2

(12) United States Patent
Amsterdam et al.

(10) Patent No.: US 10,621,990 B2
(45) Date of Patent: Apr. 14, 2020

(54) COGNITIVE PRINT SPEAKER MODELER

(71) Applicant: INTERNATIONAL BUSINESS MACHINES CORPORATION, Armonk, NY (US)

(72) Inventors: Jeff Amsterdam, Roswell, GA (US); Aaron K. Baughman, Silver Spring, MD (US); Stephen C. Hammer, Marietta, GA (US); David A. Provan, Cobb, GA (US)

(73) Assignee: International Business Machines Corporation, Armonk, NY (US)

( * ) Notice: Subject to any disclaimer, the term of this patent is extended or adjusted under 35 U.S.C. 154(b) by 157 days.

(21) Appl. No.: 15/966,122

(22) Filed: Apr. 30, 2018

(65) Prior Publication Data

US 2019/0333520 A1 Oct. 31, 2019

(51) Int. Cl.
| | | |
|---|---|---|
| *G10L 15/00* | (2013.01) | |
| *G10L 17/00* | (2013.01) | |
| *G10L 17/26* | (2013.01) | |
| *G10L 17/04* | (2013.01) | |
| *G06F 16/783* | (2019.01) | |
| *G06K 9/00* | (2006.01) | |

(52) U.S. Cl.
CPC .......... *G10L 17/005* (2013.01); *G06F 16/784* (2019.01); *G06F 16/7834* (2019.01); *G10L 17/04* (2013.01); *G10L 17/26* (2013.01); *G06K 2009/00738* (2013.01)

(58) Field of Classification Search
CPC ...................................................... G10L 15/00
USPC .................... 704/235, 233, 232, 500, 9, 234
See application file for complete search history.

(56) References Cited

U.S. PATENT DOCUMENTS

| | | | |
|---|---|---|---|
| 6,782,363 B2 | 8/2004 | Lee et al. | |
| 8,386,257 B2 | 2/2013 | Irie et al. | |
| 9,514,747 B1 | 12/2016 | Bisani et al. | |
| 9,521,179 B2 | 12/2016 | Chakarapani et al. | |
| 9,697,823 B1 * | 7/2017 | Kuo ......... | G10L 15/26 |
| 9,807,473 B2 * | 10/2017 | Mei ............. | H04N 21/8405 |
| 9,965,705 B2 * | 5/2018 | Chen ............. | G06N 3/0454 |

(Continued)

FOREIGN PATENT DOCUMENTS

JP 2005321530 A 11/2005

OTHER PUBLICATIONS

Peter Mell et al, The NIST Definition of Cloud Computing, National Institute of Standards and Technology, Publication 800-145, 2011, entire document.

(Continued)

*Primary Examiner* — Michael C Colucci
(74) *Attorney, Agent, or Firm* — Patrick J. Daugherty; Daugherty & Del Zoppo Co., LPA

(57) ABSTRACT

Aspects of the present invention provide devices that subtitle streaming video with audio and identify a speaker in a streaming video with audio according to words spoken by the speaker matched to a cognitive print. The cognitive print includes traits classified according a hierarchical long short term model (LSTM). The hierarchical LSTM includes layers of LSTMs and each layer corresponds to the classification of one trait. A processor annotates a subtitle of the words spoken by the speaker, which decorates the subtitle with a label representative of the identified speaker, and streams the decorated subtitle with the streaming video with audio.

20 Claims, 8 Drawing Sheets

(56) References Cited

U.S. PATENT DOCUMENTS

| | | | |
|---|---|---|---|
| 10,198,671 B1* | 2/2019 | Yang | G06T 11/60 |
| 10,229,111 B1* | 3/2019 | Filippova | G06F 17/2785 |
| 10,366,166 B2* | 7/2019 | Yu | G06K 9/6273 |
| 10,366,292 B2* | 7/2019 | Min | H04N 21/4884 |
| 10,467,274 B1* | 11/2019 | Ren | G06K 9/00973 |
| 10,477,148 B2* | 11/2019 | Bright-Thomas | G06K 9/00711 |
| 2009/0016600 A1 | 1/2009 | Eaton et al. | |
| 2010/0028841 A1 | 2/2010 | Eatough et al. | |
| 2012/0139940 A1 | 6/2012 | Chavanne | |
| 2014/0079297 A1* | 3/2014 | Tadayon | G06K 9/00 382/118 |
| 2015/0287405 A1 | 10/2015 | Biadsy et al. | |
| 2016/0099010 A1* | 4/2016 | Sainath | G10L 25/30 704/232 |
| 2017/0294186 A1 | 10/2017 | Pinto et al. | |
| 2017/0309291 A1 | 10/2017 | Ozerov et al. | |
| 2017/0372694 A1* | 12/2017 | Ushio | G06N 3/0445 |
| 2018/0018970 A1* | 1/2018 | Heyl | G10L 17/18 |
| 2018/0025721 A1* | 1/2018 | Li | G10L 15/16 704/232 |
| 2018/0075343 A1* | 3/2018 | van den Oord | G06F 17/2818 |
| 2018/0144248 A1* | 5/2018 | Lu | G06F 17/241 |
| 2018/0174576 A1* | 6/2018 | Soltau | G10L 15/16 |
| 2018/0189260 A1* | 7/2018 | Kannan | G06F 17/276 |
| 2018/0204111 A1* | 7/2018 | Zadeh | G06N 3/0436 |
| 2018/0254040 A1* | 9/2018 | Droppo | G10L 17/18 |
| 2018/0308487 A1* | 10/2018 | Goel | G10L 15/1815 |
| 2018/0373979 A1* | 12/2018 | Wang | G06K 9/00664 |
| 2018/0376108 A1* | 12/2018 | Bright-Thomas | H04N 7/152 |
| 2019/0035390 A1* | 1/2019 | Howard | G10L 15/18 |
| 2019/0108832 A1* | 4/2019 | Tomar | G10L 15/16 |
| 2019/0130281 A1* | 5/2019 | Yang | G06N 5/02 |
| 2019/0286691 A1* | 9/2019 | Sodhani | G06F 17/243 |
| 2019/0304438 A1* | 10/2019 | Qian | G10L 15/063 |

OTHER PUBLICATIONS

Simon Haykin et al, Cognitive Radar: Step Toward Bridging the Gap Between Neuroscience and Engineering, Proceedings of the IEEE, vol. 100, Issue 11, 2012, entire document N. Shobha Rani et al, IEEE Xplore, International Conference on Trends in Automation, Communications and Computing Technology (I-TACT-15), 2015, https://ieeexplore.ieee.org/xpl/mostRecentIssue.jsp?punumber=7490162, entire document.

Murali Mani et al, Active learning in computer science education using meta-cognition (abstract only), Proceedings of the 43rd ACM technical symposium on Computer Science Education, 2012, entire document.

James H. Smith-Spark et al, Label-checking strategies to adapt behaviour to design, Proceedings of the European Conference on Cognitive Ergonomics, Article No. 13, ACM DL Digital Library, https://dl.acm.org/citation.cfm?id=2788425&dl=ACM&coll=DL, 2015, entire document.

European Conference on Cognitive Ergonomics, Understanding Design through Cognition, https://ecce2015.pja.edu.pl, entire document.

* cited by examiner

COGNITIVE PRINT SPEAKER MODELER

BACKGROUND

Subtitling of Hypertext Transfer Protocol (HTTP) live streaming (HLS) generates written text or transcription of spoken words that can be displayed concurrently with the streaming video with audio. Subtitling can use automatic speech recognition (ASR) algorithms, which generate the written text that include word error rates and word recognition rates.

The word error rates indicate a frequency with which the written text incorrectly/correctly represents the spoken words of one or more speakers audible in the streaming video with audio. The word recognition rates indicate a frequency that written words can be identified for the spoken words.

A conventional approach to minimizing transcription word error rates while improving word recognition rates is a biometric identification of each speaker and a transcription of spoken words according to ASR of each biometrically identified speaker.

BRIEF SUMMARY

In one aspect of the present invention, a computer-implemented method for subtitling of streamed video with audio includes executing on a computer processor identifying a speaker in a streaming video with audio according to words spoken by the speaker matched to a cognitive print. The cognitive print includes a plurality of traits classified according to a hierarchical long short term memory (LSTM) model. The hierarchical LSTM model includes a plurality of layers of LSTMs and each layer corresponds to the classification of one trait of the plurality of traits. The computer processor annotates a subtitle of the words spoken by the speaker, which decorates the subtitle with a label representative of the identified speaker, and adds the decorated subtitle to the streaming video with audio.

In another aspect, a system has a hardware processor, computer readable memory in circuit communication with the processor, and a computer-readable storage medium in circuit communication with the processor and having program instructions stored thereon. The processor executes the program instructions stored on the computer-readable storage medium via the computer readable memory and thereby subtitles streaming video with audio, which identifies a speaker in a streaming video with audio according to words spoken by the speaker matched to a cognitive print. The cognitive print includes a plurality of traits classified according to a hierarchical long short term memory (LSTM) model. The hierarchical LSTM model includes a plurality of layers of LSTMs and each layer of LSTMs corresponds to the classification of one trait of the plurality of traits. The processor annotates a subtitle of the words spoken by the speaker, which decorates the subtitle with a label representative of the identified speaker, and streams the decorated subtitle with the streaming video with audio.

In another aspect, a computer program product for subtitling of streamed video with audio has a computer-readable storage medium with computer readable program code embodied therewith. The computer readable hardware medium is not a transitory signal per se. The computer readable program code includes instructions for execution by a processor that cause the processor to identify a speaker in a streaming video with audio according to words spoken by the speaker matched to a cognitive print. The cognitive print includes a plurality of traits classified according to a hierarchical long short term memory (LSTM) model. The hierarchical LSTM model includes a plurality of layers of LSTMs and each layer corresponds to the classification of one trait of the plurality of traits. The processor annotates a subtitle of the words spoken by the speaker, which decorates the subtitle with a label representative of the identified speaker, and streams the decorated subtitle with the streaming video with audio.

BRIEF DESCRIPTION OF THE DRAWINGS

These and other features of embodiments of the present invention will be more readily understood from the following detailed description of the various aspects of the invention taken in conjunction with the accompanying drawings in which.

DETAILED DESCRIPTION

Figure 1:
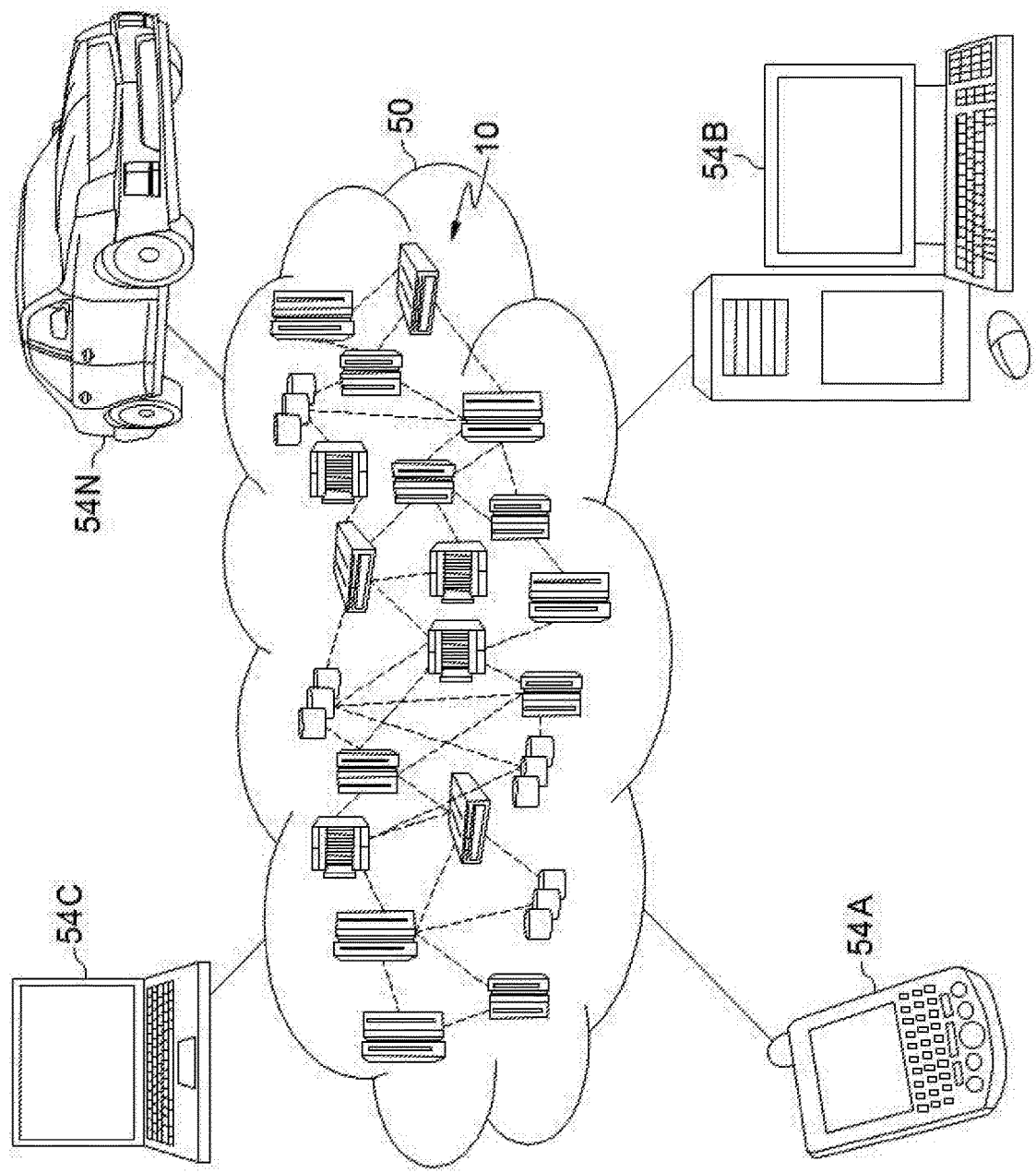
FIG. 1 depicts a cloud computing environment according to an embodiment of the present invention.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
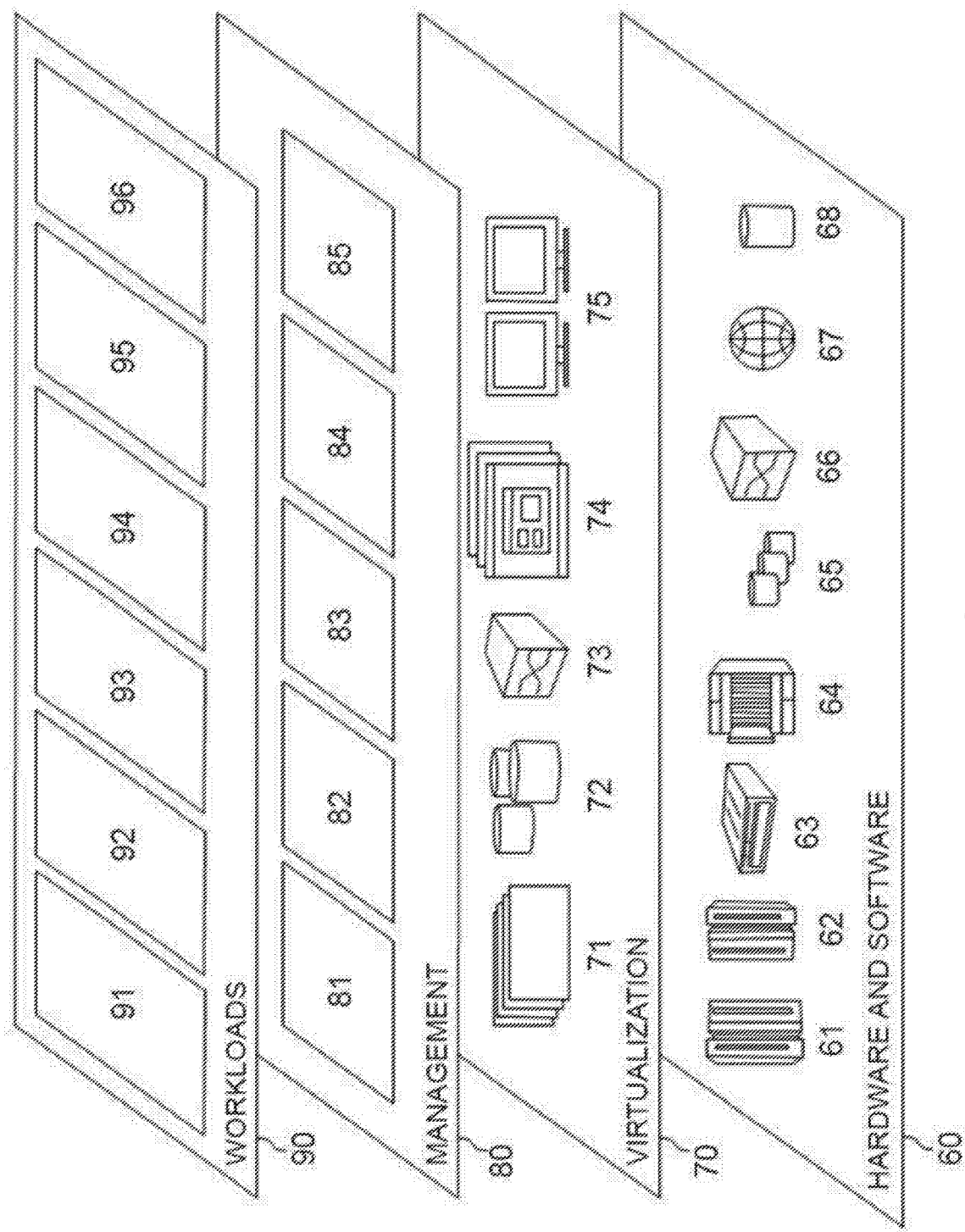
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and processing for subtitling of streamed video with audio 96.

Figure 3:
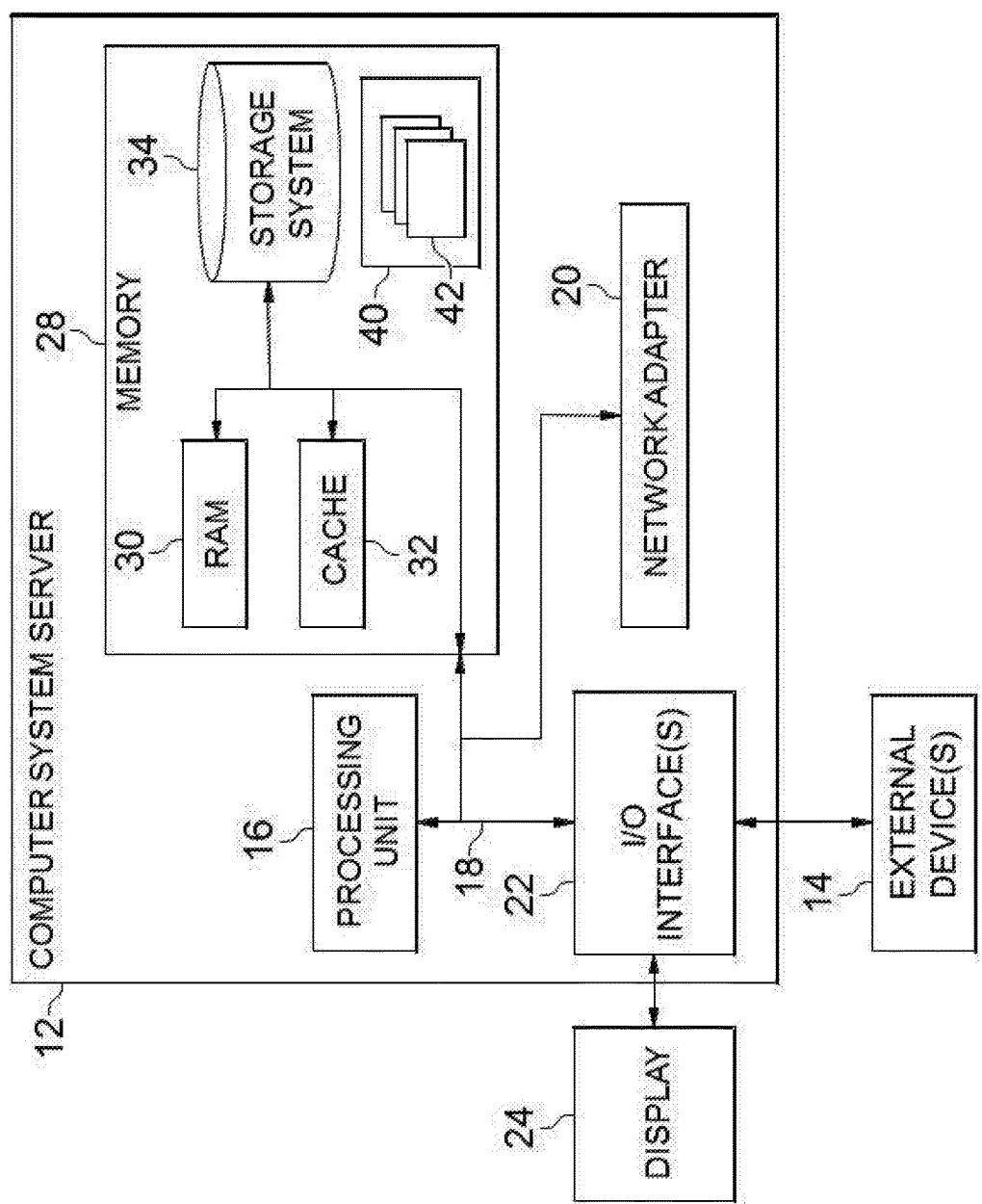
FIG. 3 depicts a computerized aspect according to an embodiment of the present invention.

FIG. 3 is a schematic of an example of a programmable device implementation 10 according to an aspect of the present invention, which may function as a cloud computing node within the cloud computing environment of FIG. 2. Programmable device implementation 10 is only one example of a suitable implementation and is not intended to suggest any limitation as to the scope of use or functionality of embodiments of the invention described herein. Regardless, programmable device implementation 10 is capable of being implemented and/or performing any of the functionality set forth hereinabove.

A computer system/server 12 is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

The computer system/server 12 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 4:
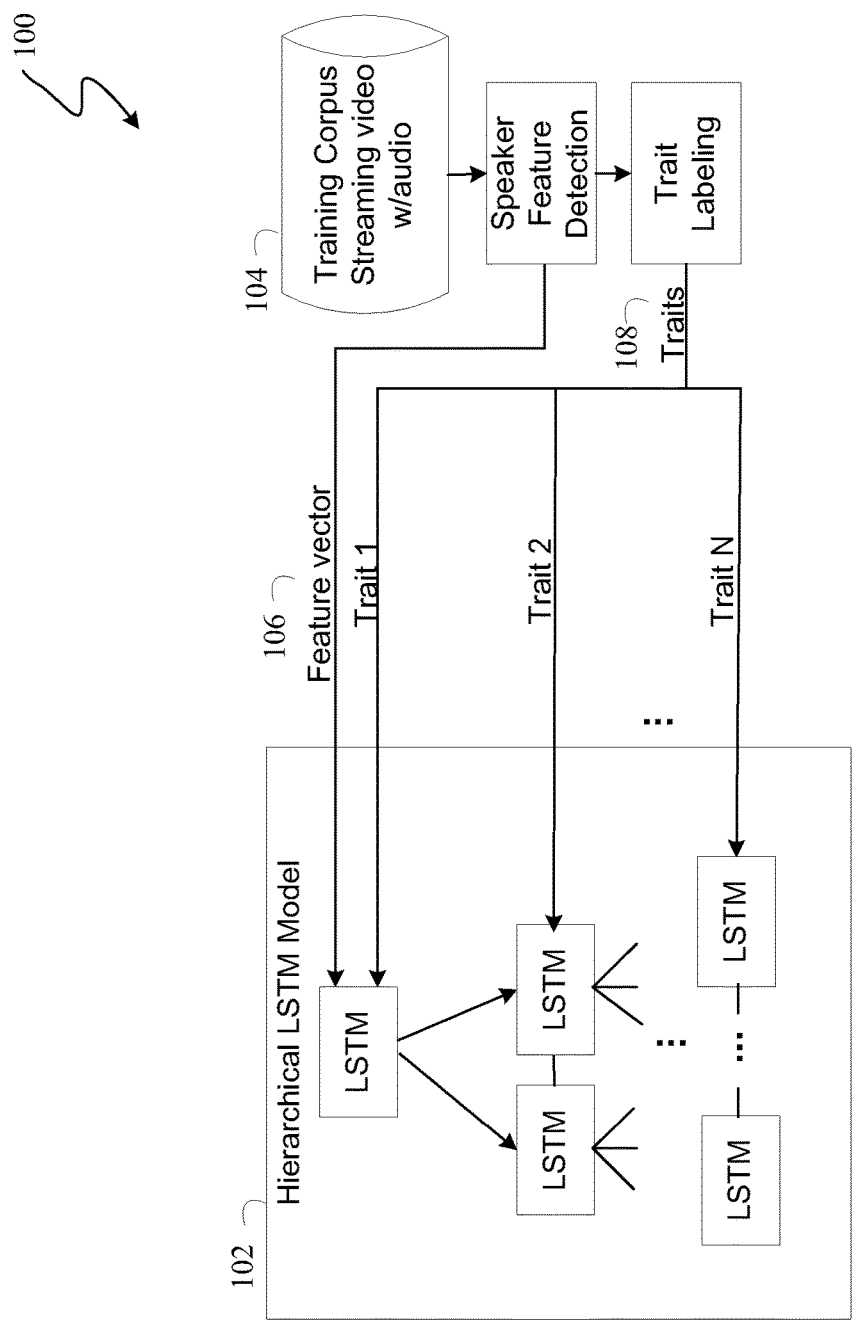
FIG. 4 depicts a schematic illustration of system aspects according to an embodiment of the present invention.

FIG. 4 illustrates schematically a system 100 according to the present invention for subtitling of streaming video with audio. The computer system/server 12 includes a hierarchical long short term memory (LSTM) model 102 that is trained with a corpus of streaming video with audio 104. Long short term memory units or blocks are building units used in recurrent neural networks, which known in the art.

The hierarchical LSTM model 102 includes a plurality of layers, N. Each of the N layers includes a corresponding number of LSTMs. For example, the first layer includes 1 LSTM. The Nth layer includes N LSTMs. Each layer is configured to classify a feature vector 106 representing spoken words of each identified speaker according to one trait. The layers operate together to classify the feature vector 106 representing the spoken words of each identified speaker according to N traits 108. The traits 108 include tone, stress, pitch, sentiment, social propensity, prosody, accent, and combinations thereof. The order of the layers determines the order of classification of the individual traits. Various orderings are contemplated. For example, tone is easier to classify than social propensity. Tone is classified in a layer higher in the hierarchy of layers of LSTMs and social propensity is lower in the hierarchy of layers of LSTMs.

Each layer of LSTMs is in communication with the next successive layer of LSTMs. Each layer of LSTMs can account for successive differences in the feature vector 106 representing the spoken words. For example, a tone of a speaker S is classified as "happy." A next lower layer is ordered to include pitch, which classifies the residual variance of the feature vector 106 corresponding to tone for those speakers in the tone class of "happy."

The training corpus of streaming video with audio 104 includes audio of spoken words identified for a plurality of speakers, S. The training corpus of streaming video with audio 104 is selected to include variations in each trait of the traits 108 among the S speakers. The training corpus of streaming video with audio 104 is stored in the storage system 34. The streaming video with audio can be received via HLS, which includes segmented streamed video with audio, such as a MPEG-2 transport stream (ISO/IEC standard 13818-1 or ITU-T Rec. H.222.0) (MPEG-TS), fragmented (RFC 8216) MPEG-4 (ISO/IEC Moving Picture Experts Group (MPEG) (ISO/IEC JTC1/SC29/WG11) under the formal standard ISO/IEC 14496 video (fMP4), and Dynamic Adaptive Streaming over HTTP (MPEG-DASH). In some embodiments, the streamed video with audio can include proprietary formats or other file formats, such as AVI, WMV, MOV, FLV, and the like. In some embodiments, the streamed video with audio 104 can be identified according to a multimedia playlist, such as an m3u8 (a UTF-8 Encoded Audio Playlist file) file format.

The computer system/server 12 derives the feature vectors from the streaming video with audio. For example, segments of the streaming video with audio are converted to spectrograms. Features can be derived and quantified based on frequencies, amplitudes, loudness and patterns of the combination thereof represented within the spectrogram. The combination of derived features forms the feature vector 106. An interval of the feature vector 106 can be selected to correspond to each syllable, spoken word, phrase, sentence, segment or combinations thereof. In some embodiments, the interval can be selected to corresponding to a group of spoken words grouped on a length of silence between words. In some embodiments, the interval can be fixed.

The computer system/server 12 labels each feature vector 106 with corresponding traits 108. The values of the each of the traits 108 can be identified programmatically, manually entered via the local computing device 54, and combinations thereof. Each trait can include a representation of a value from a predetermined numerical range of values or a predetermined set of values.

The trait of tone of each feature vector 106 is labeled with reference to classifications of pitch, quality, and strength. The classifications of pitch, quality and strength can be represented as labeled emotions. For example, the tone can be represented with emotions reflected in the sound, such as from a set of values of happy, sad, fear, anger, joy, disgust, surprise, trust, anticipation, and combinations thereof. In some embodiments, the classifications include a set of values representing a combination of individual values for pitch, quality and strength.

The trait of stress of each feature vector 106 is labeled according to a state of mental or emotional strain or tension resulting from adverse or very demanding circumstances. For example, 0 indicates no stress and 1 indicates highly stressful, while 0.5 is mildly stressful.

The trait of pitch of each feature vector 106 is labeled according to a quality of a sound governed by the rate of vibrations producing the sound, and the degree of highness or lowness of a tone. For example, the pitch can be represented as a statistic of vibration rates for the interval corresponding to the feature vector, such as an average, minimum, maximum, range, deviation, variance, and the like.

The trait of sentiment includes label values for each feature vector 106 indicating a feeling or emotion, such as positive, neutral, or negative.

The trait of social propensity label values for each feature vector 106 that identify an inclination or natural tendency to behave in a particular way towards others. For example, end points at one end can represent very likeable and trustworthy and the opposite end point representing non-likeable and not trustworthy with varying degrees in between.

The trait of prosody identifies patterns of stress and intonation, such as the rise and fall of the voice in speaking in a language. The prosody can be classified according to predefined patterns for each feature vector 106. For example, the patterns can be represented as variable length with fixed time periods and each time period indicating a rise or a fall in the voice in that period. The interval can include a predefined range of values that indicate a magnitude of the rise or fall.

The accent includes label values for each feature vector 106 that classify a distinctive mode of pronunciation of a language. The label values can be associated with a particular nation, locality, social class, or combinations thereof. For example, {United Kingdom, London, middle class} can be distinguished from {United Kingdom, London, upper class}. Localities can be states, provinces, regions, cities, etc. Social class can include a predefined set of social economic classes, such as lower, middle, upper. Alternatively, social classes can be educationally distinct, such as educated, non-educated. Social class can be alternatively represented on a predefined numerical scale or from a predetermined set of values.

The computer system/server 12 trains the hierarchical LSTM model 102 using the feature vectors 106 and corresponding labeled traits 108. The labeled traits 108 form a cognitive print for each identified speaker. The hierarchical LSTM model is trained using the traits ordered. For example, the highest level or first layer of the hierarchical LSTM model 102 receives the feature vectors and labels of a first ordered trait for training. Each lower level or next layer receives labels of a different trait in order.

Figure 5:
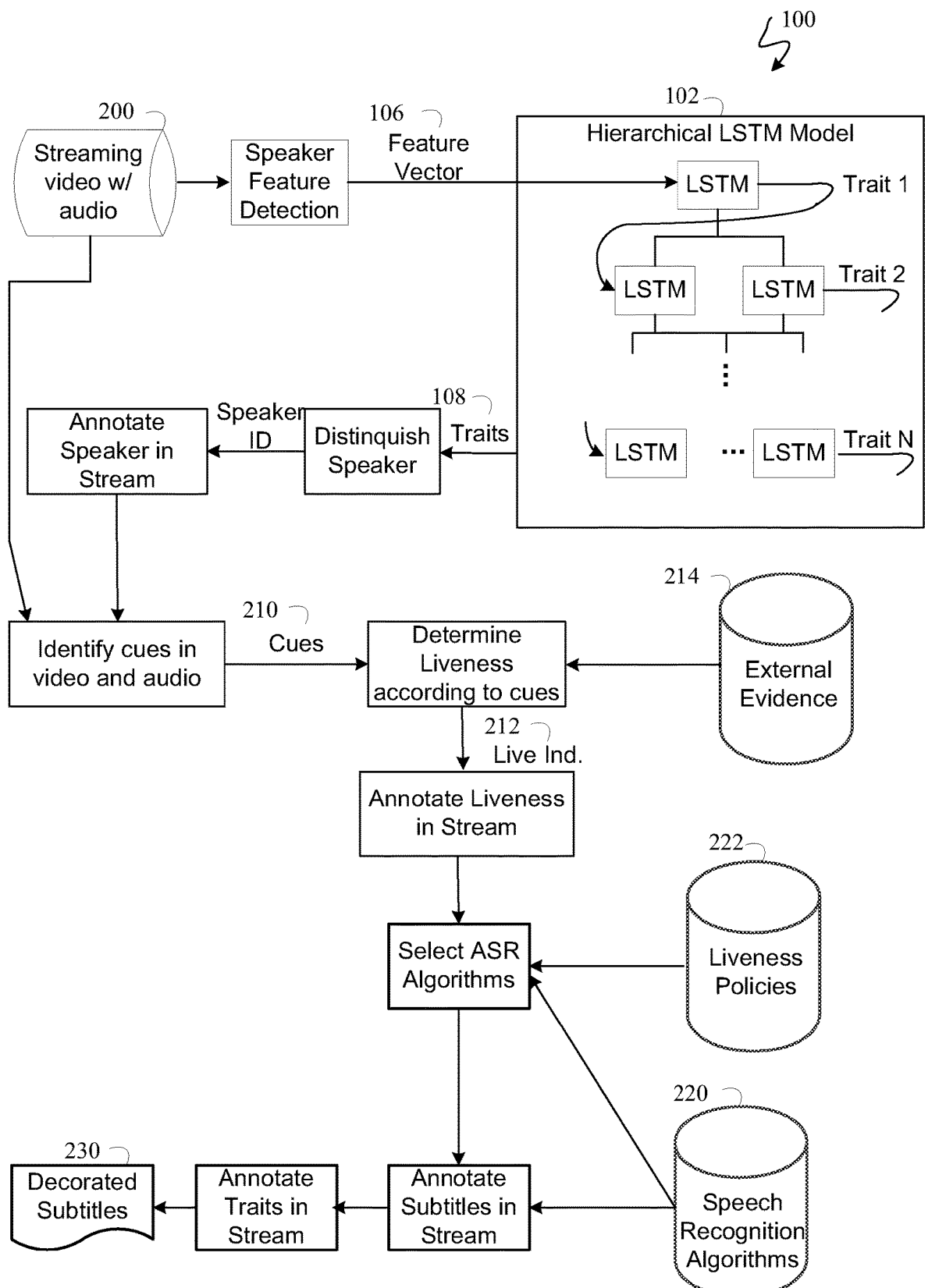
FIG. 5 depicts a schematic illustration of system aspects according to an embodiment of the present invention.

FIG. 5 depicts an embodiment of the system 100 which subtitles streaming video with audio 200. The streaming video with audio 200 can be received via the HLS, which includes the segmented streaming video with audio.

The computer system/server 12 identifies a speaker in the streaming video with audio 200 according to words spoken by the speaker matched to the cognitive print using the trained hierarchical LSTM model 102. The cognitive print includes the N traits 108, each classified according to the hierarchical long short term memory (LSTM) model. The hierarchical LSTM model 102 includes N layers of LSTMs. Each layer classifies one trait of the N traits 108. As each layer classifies one trait, the layer outputs the classification to the next layer. The output can be expressed as a tuple or a list, which includes a value classified from the set of values or numerical range, and a probability associated with the classification. The classification of the traits 108 in the feature vector 106 are ordered according to the layers in the hierarchical LSTM model 102. The hierarchical LSTM model 102 outputs the traits 108, which can include a value representing each classified trait and an associated probability for the classified trait for the corresponding feature vector 106.

The classification of the speaker according to the traits 108 provides improvements over conventional methods using a biometric matching of the speaker. The classification of the traits 108 by the hierarchical LSTM model 102 reduces the computational requirements for distinguishing each speaker in the streaming video with audio 200. The hierarchical LSTM model 102 does not require a biometric match, which can be computationally infeasible in broad domains of live multimedia that can include a variety and high magnitude of speakers in each streamed video. The hierarchical LSTM model 102 allows for continuous improvement of the speaker identity as more of the streaming video with audio 200 is processed. That is, as the classification proceeds from layer to layer and the probability increases with additional data, the traits 108 more accurately identify each speaker.

The computer system/server 12 distinguishes spoken words of the speakers for the streaming video with audio 200 according to the traits 108 classified from the hierarchical LSTM model 102 for each feature vector 106. The computer system/server 12 associates a speaker identifier with each unique set of traits 108, such as S1 for a first speaker, S2 for a second speaker, etc. The speakers are distinguished by a corresponding cognitive print for each set of spoken words. The cognitive print for each speaker differs by at least one trait of the traits 108. For example, a first speaker is different from a second speaker according to a trait of pitch. As feature vectors 106 of more spoken words are processed, additional speakers can be identified according to differences in the traits 108.

The computer system/server 12 annotates the speaker in a generated subtitle 230 according to an identifier for each speaker. For example, the annotation of a group of spoken words can include a text label for each speaker, such as "S1" for a first speaker, "S2" for a second speaker, etc. The generated subtitle 230 can include text representations of words spoken by each speaker and additional information. Decorations can be added to the generated subtitle 230, which are visibly displayed with the streaming video with audio 200. The computer system/server 12 adds labels of the speaker identifiers to the streaming video with audio 200 that decorate the subtitle 230. The annotations can be added to the streaming video with audio 200, such as embedded within the streaming video, or as a separate channel synchronized with the streaming video with audio 200. Additional information annotated with the streaming video with audio 200 can be displayed to decorate the subtitle 230 or included but not displayed. The decorations can be optionally controlled by the computer system/server 12.

The computer system/server 12 identifies cues 210 in the streaming video with audio 200. The cues 210 include indicators of a time and a location present in the video, the audio, and combinations thereof. The cues 210 can include objects indicative of weather shown in video, noises indicative of weather in audio, objects identifying an event, objects identifying a location, facial recognition of persons present in video, statements of an event in audio, statements of a location in audio, statements of a time in audio, objects indicative of time present in video, objects indicative of speaker health in video, and audio indicative of speaker health. For example, objects can be recognized in the video, such as clouds, stars, sun shadows, clock faces, text labels of an event label, text labels of a location, buildings or structures unique to a location, etc. Sounds can be recognized from the audio, such as rain sounds, traffic noise, sirens, ship noise, statements by speakers of a time and/or location, etc. In some embodiments, traits 108 of a confirmed speaker identity can be compared with prior determined traits for the same speaker and with health records for the confirmed speaker. For example, Mike Jones is confirmed as speaker 51 in the streaming video with audio 200 with traits $T_1$, and from a prior streaming video with audio with traits $T_2$.

The computer system/server 12 determine a liveness indicator 212 for the streaming video with audio 200, which indicates whether the streaming video with audio 200 is streamed live by comparing the cues 210 with external electronic sources 214. For example, a sun shadow recognized as an object from the video can indicate a time of day. Structures recognized as an object, such as a well known building or structure can indicate a geographic location and an event. The indicated time of day for the geographic location and/or event can be compared with known sources that currently identify time for the geographic location or event. A live streamed video differs only temporally from a non-live streamed video. That is, the streaming video with audio 200, which is live, is generated by a camera and transmitted concurrently. The transmission can include a small delay, which overlaps the generation of the streaming video with audio 200, such as less than a minute. The streaming video with audio 200 that is non-live is stored for more than a minute and then transmitted at a later time.

The external electronic sources 214 include an electronic source of weather reported for a geographic location at current time, electronic source of an event calendar, a known live electronic video feed from a geographic location, a known live electronic audio feed for a geographic location, an electronic source of health records for a speaker, an electronic source of reported news, an electronic source of a person's itinerary, and an electronic sources of social media. For example, health records for a speaker, Mike Jones indicate that Mike Jones is currently suffering from a cold and the traits differ only by a lower pitch for $T_1$, which suggests that the current traits $T_1$ are live. Other considerations can apply, such as an itinerary for Mike Jones that places Mike Jones at the identified geographic location for the identified event at the identified time of day.

The computer system/server 12 annotates the subtitles of the spoken words spoken by the speaker with the liveness indicator 212. The liveness indicator 212 can be represented with a binary value and a probability. In some embodiments, the liveness indicator 212 can be represented with a time estimate of the delay between the generation of the streaming video with audio and the received streaming video with audio 200 for subtitling.

The computer system/server 12 selects an automatic speech recognition algorithm from a plurality of automatic speech recognition (ASR) algorithms 220 according to the liveness indicator 212 and a policy 222. ASR algorithms 220 are known in the art, which can include algorithms trained with a particular corpus. For example, more precise slower oriented algorithms can use larger word dictionaries to identify words, and more recalled oriented algorithms can use smaller dictionaries of words for faster word identification. The algorithms can include deep learning models, LSTMs constructed models, and the like. The training corpus is selected with feature vectors and labels of the spoken words that correspond to the feature vectors. The feature vectors for the ASR algorithm can be the same or different that the feature vectors 106 used by the hierarchical LSTM model 102. The algorithm can be separate from the hierarchical LSTM model 102, use traits 108 for algorithm selection, or integrate use of the traits 108 into the ASR algorithm.

The policy 222 can include rules, which determine the selection according to the liveness indicator 212 and a bandwidth of the streaming video with audio 200. For example, rules can selected a more precise ASR algorithm (e.g. larger dictionary) for the liveness indicator 212 value of "live" and a large bandwidth (e.g. 10 MB/sec), than for the liveness indicator 212 value of "live" and a small bandwidth (e.g. <1 MB/sec). The rules can include defaults according to the liveness indicator 212. For example, a liveness indicator 212 value of "live" defaults to a fastest recall algorithm (e.g. maximizes word recognition rate), and a "non-live" value defaults to a slow precision oriented algorithm (e.g. minimizes word error rate).

The computer system/server 12 annotates the subtitle 230 of the words spoken by each speaker with text representing the spoken words. The computer system/server 12 can decorate the subtitle 230 with the text of spoken words following the annotation of the speaker identifier according to the selected ASR algorithm. For example, "S1: You look happy." includes the speaker labeled as "S1" followed by the text of spoken words generates as a text string by the selected ASR algorithm for words spoken "You look happy."

The computer system/server 12 can annotate the subtitle 230 with the traits 108 of the identified speaker. Values for the traits 108 can be mapped to meaningful labels or icons, which are optionally added as decorations in the subtitle 230. For example, a tone value of happy can be added as a smiling face icon to decorate the generated subtitle.

The computer system/server 12 adds the decorated subtitle 230 to the streamed video with audio 200. The added decorated subtitle 230 can be re-streamed embedded in the video of the streaming video with audio 200 or added as a separate channel. In some embodiments, the decorated subtitle 230 includes non-displayed information, which is included in the streaming video with audio 200, such as the traits 108.

Figure 6:
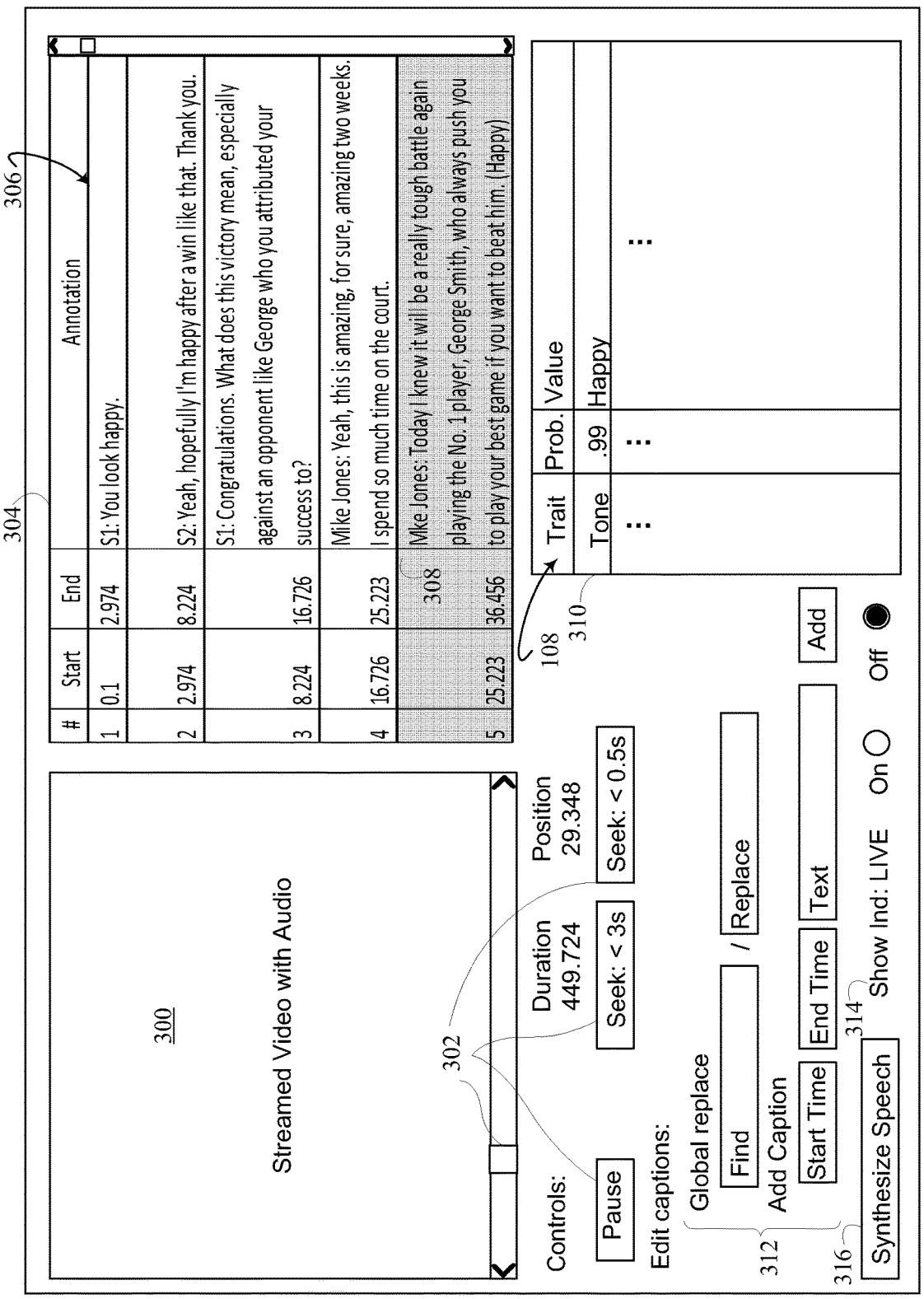
FIG. 6 depicts an example user interface according to an embodiment of the present invention.

FIG. 6 depicts an example display from the computer system/server 12. The example display is displayed on the display 24, which can include the display of the local computing device 54. Video of the streaming video with audio 200 is displayed in a first region 300. Audio of the streaming video with audio 200 can be made audible through the external devices 14, such as a speaker, headphones, and the like. Controls 302 for the first region 300 include selection, pause, seek, movement forward or movement backward through the video.

The example display includes a second region 304, which displays decorated subtitles 306. The decorated subtitles 306 can be synchronized with the first region 300. For example, a shading is added to the decorated subtitle 308 that is currently presented with video in the first region 300 and generated audibly with the external device 14, which indicates the shaded decorated subtitle as currently presented in the first region 300 and audible. The displayed decorated subtitles 306 can include visual representations of what is re-streamed or added as a channel.

A third region 310 of the display can include the corresponding values of the traits 108. The third region 310 can also be synchronized with the first region 300 and the second region 304. For example, values of each trait and the associated probability are displayed for the current speaker in the third region 310, which is also synchronized with the shaded decorated subtitle 308.

Edit functions for the decorated subtitles are included in a fourth region 312. Edit functions can include a global search and replace function. For example, the global search and replace function can be used to change a confirmed speaker identity of speaker identifier S1 as Mike Jones, which changes labels in every decorated subtitle 306 for the label 51 to Mike Jones. The edit functions can include adding or changing a particular decorated subtitle 306. For example, "(Happy)" can be added to the current decorated subtitle 308. A liveness indicator control 314 controls whether the liveness indicator 212 is included in decorated subtitle 306.

A synthesize speech control 316 controls the computer system/server 12 to generate synthesized speech from the text of the current subtitle 308 using the traits 108. This operates in a reverse direction of the text from the speech according to the selected ASR algorithm. That is, the combination of traits with the text of words can be used to generate synthetic speech, which approximately mimics the original spoken words.

Figure 7:
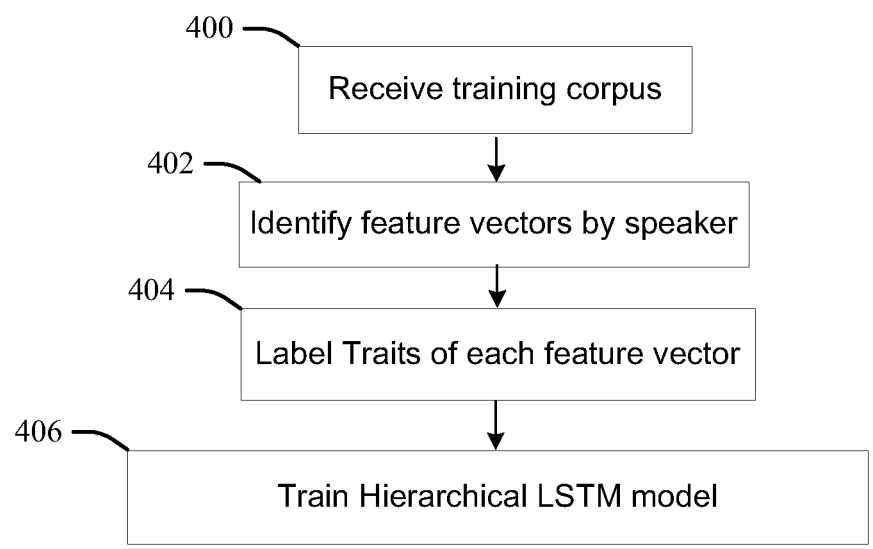
FIG. 7 is a flow chart illustration of an embodiment of the present invention.

FIG. 7 illustrates one embodiment of a method according to the present invention for subtitling of streamed video with audio. At 400, a processor that is configured according to an aspect of the present invention (the "configured processor") receives the training corpus 104 of streaming video with audio. In some embodiments, the training corpus 104 can exclude the video and include only the audio. The configured processor may be implemented in accordance with the computer system server 12 of FIG. 3, including as the cloud node 10 of FIG. 1, as described respectively above.

At 402, the configured processor identifies the feature vectors 106 according to each speaker for spoken words in the received training corpus 104. For example, the configured processor converts the audio to spectrograms, and identifies features forming the feature vector 106 according to characteristics of each spectrogram.

At 404, the configured processor labels the traits 108 of each feature vector 106. The traits include N traits. The traits include tone, stress, pitch, sentiment, social propensity, prosody, accent and combinations thereof.

At 406, the configured processor trains the hierarchical LSTM model 102 according to the feature vectors 106 and the traits 108.

Figure 8:
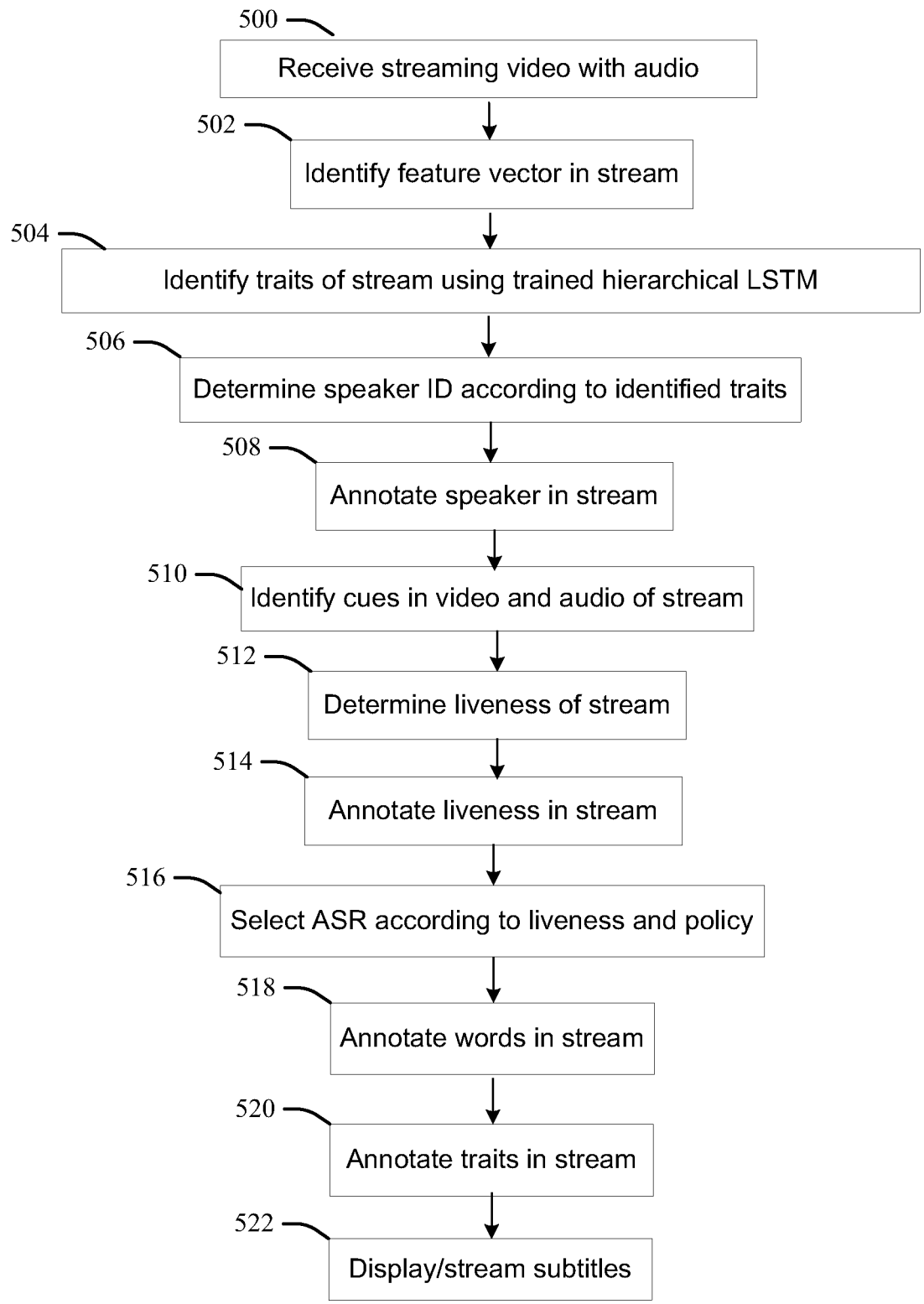
FIG. 8 is a flow chart illustration of another embodiment of the present invention.

FIG. 8 illustrates one embodiment of a method according to the present invention for subtitling of streamed video with audio. At 500, the configured processor receives the streaming video with audio 200. The streaming video with audio 200 can include identification of a bandwidth of the streaming.

At 502, the configured processor identifies the feature vectors 106 for the audio of the streaming video with audio 200.

At 504, the configured processor identifies the traits 108 associated with each feature vector 106 of the received streaming video with audio 200 using the trained hierarchical LSTM model 102. The hierarchical LSTM model 102 outputs the traits 108 according to classification of each trait of the feature vector 106. The hierarchical LSTM model 102 includes layers of LSTMs and each layer corresponds to the classification of one trait.

At 506, the configured processor distinguishes each speaker in a streaming video with audio according to words spoken by the speaker matched to a cognitive print. The cognitive print includes the traits 108, which are used to distinguish speakers by values of at least one trait.

At 508, the configured processor labels each speaker with a unique identifier within the streaming video with audio 200. For example a first speaker can be labeled "S1", and a second speaker can be labeled "S2". The labeling can include combinations of letters and numbers. The labels can be modified. For example, a global search and replace can change the label to a confirmed identifier in each subtitle 230, such as a name of the speaker. The confirmed name can be used for searching the external electronic sources 214 of evidence.

At 510, the configured processor identifies the cues 210 in the streaming video with audio 200. The cues 210 include indicators of a time and a location, which are identified from combinations of objects in the video and sounds in the audio of the streaming video with audio 200.

At 512, the configured processor determines the liveness indicator 212 for the streaming video with audio 200, which indicates whether the streaming video with audio 200 is streamed live by comparing the cues 210 with the external electronic sources 214 of evidence.

At 514, the configured processor annotates the streaming video with audio 200 to include the liveness indicator 212 in the subtitle 230.

At 516, the configured processor selects an ASR algorithm from a plurality of ASR algorithms according to the liveness indicator 212 and the policy 222.

At 518, the configured processor annotates the subtitle 230 of the words spoken by the speaker, which decorates with the text of spoken words according to the selected ASR algorithm.

At 520, the configured processor can annotate the subtitle 230 with the traits 108. The configured processor can decorate the subtitle 230 with text labels or icons representing values of one or more of the traits 108.

At 520, the configured processor can display the decorated subtitle 230 on the display 24, add the decorated subtitle 230 to a channel synchronized with the streaming video with audio 200, or add the subtitle directly to the video of the streaming video with audio 200.

The terminology used herein is for describing particular aspects only and is not intended to be limiting of the invention. As used herein, the singular forms "a", "an" and "the" are intended to include the plural forms as well, unless the context clearly indicates otherwise. It will be further understood that the terms "include" and "including" when used in this specification specify the presence of stated features, integers, steps, operations, elements, and/or components, but do not preclude the presence or addition of one or more other features, integers, steps, operations, elements, components, and/or groups thereof. Certain examples and elements described in the present specification, including in the claims, and as illustrated in the figures, may be distinguished, or otherwise identified from others by unique adjectives (e.g. a "first" element distinguished from another "second" or "third" of a plurality of elements, a "primary" distinguished from a "secondary" one or "another" item, etc.) Such identifying adjectives are generally used to reduce confusion or uncertainty, and are not to be construed to limit the claims to any specific illustrated element or embodiment, or to imply any precedence, ordering or ranking of any claim elements, limitations, or process steps.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for subtitling of streaming video with audio, comprising executing on a computer processor:
   identifying a speaker in a streaming video with audio according to words spoken by the speaker matched to a cognitive print, wherein the cognitive print comprises a plurality of traits classified according to a hierarchical long short term memory (LSTM) model, wherein the hierarchical LSTM model comprises a plurality of layers of LSTMs and each layer corresponds to the classification of one trait of the plurality of traits;
   annotating a subtitle of the words spoken by the speaker, which decorates the subtitle with a label representative of the identified speaker; and
   adding the decorated subtitle to the streaming video with audio.

2. The method of claim 1, wherein identifying the speaker in the streaming video with audio comprises:
   distinguishing a plurality of speakers in the streaming video with audio, each according to corresponding words spoken by the speaker and a corresponding cognitive print, wherein the corresponding cognitive print differs for each speaker by at least one trait of the plurality of traits.

3. The method of claim 1, wherein the plurality of traits comprises a trait selected from the group consisting of tone, stress, pitch, sentiment, social propensity, prosody, and accent.

4. The method of claim 1, further comprising:
   identifying cues in the streaming video with audio, wherein the cues comprises indicators of a time and a location;
   determining a liveness indicator for the streaming video with audio which indicates whether the streaming video with audio is streamed live by comparing the cues with external electronic sources; and
   annotating the subtitle of the words spoken by the speaker, which includes the liveness indicator in the decorated subtitle.

5. The method of claim 4, further comprising:
   selecting an automatic speech recognition algorithm from a plurality of automatic speech recognition algorithms according to the liveness indicator and a policy; and
   annotating the subtitle of the words spoken by the speaker, which decorates the subtitle of words spoken by the identified speaker with the text of spoken words according to the selected automatic speech recognition algorithm.

6. The method of claim 4, wherein the cues in the streaming video comprise a cue selected from a group consisting of: objects indicative of weather shown in video, noises indicative of weather in audio, objects identifying an event, objects identifying a location, facial recognition of persons present in video, statements of an event in audio, statements of a location in audio, statements of a time in audio, objects indicative of time present in video, objects indicative of speaker health in video, and audio indicative of speaker health; and
   wherein external electronic sources comprise a source selected from a group consisting of: an electronic source of weather reported for a geographic location at current time, an electronic source of an event calendar, a known live electronic video feed from a geographic location, a known live electronic audio feed for a geographic location, an electronic source of health records for a speaker, an electronic source of reported news, an electronic source of a person's itinerary, and an electronic sources of social media.

7. The method of claim 1, further comprising:
integrating computer-readable program code into a computer system comprising a processor, a computer readable memory in circuit communication with the processor, and a computer readable storage medium in circuit communication with the processor; and
wherein the processor executes program code instructions stored on the computer-readable storage medium via the computer readable memory and thereby performs the identifying a speaker in a streaming video with audio according to words spoken by the speaker matched to a cognitive print.

8. The method of claim 7, wherein the computer-readable program code is provided as a service in a cloud environment.

9. A system for subtitling streaming video with audio, comprising:
a processor;
a computer readable memory in circuit communication with the processor; and
a computer readable storage medium in circuit communication with the processor;
wherein the processor executes program instructions stored on the computer-readable storage medium via the computer readable memory and thereby:
identify a speaker in a streaming video with audio according to words spoken by the speaker matched to a cognitive print, wherein the cognitive print comprises a plurality of traits classified according to a hierarchical long short term memory (LSTM) model, wherein the hierarchical LSTM model comprises a plurality of layers of LSTMs and each layer of LSTMs corresponds to the classification of one trait of the plurality of traits;
annotate a subtitle of the words spoken by the speaker, which decorates the subtitle with a label representative of the identified speaker; and
stream the decorated subtitle with the streaming video with audio.

10. The system of claim 9, wherein the processor executes program instructions stored on the computer-readable storage medium via the computer readable memory and thereby:
distinguish a plurality of speakers in the streaming video with audio, each according to corresponding words spoken by the speaker and a corresponding cognitive print, wherein the corresponding cognitive print differs for each speaker by at least one trait of the plurality of traits.

11. The system of claim 9, wherein the plurality of traits comprises a trait selected from a group consisting of tone, stress, pitch, sentiment, social propensity, prosody, and accent.

12. The system of claim 9, wherein the processor executes program instructions stored on the computer-readable storage medium via the computer readable memory and thereby:
identify cues in the streaming video with audio, wherein the cues comprises indicators of a time and a location;
determine a liveness indicator for the streamed video with audio which indicates whether the streaming video with audio is streamed live by comparing the cues with external electronic sources; and
annotate the subtitle of the words spoken by the speaker, which includes the liveness indicator in the decorated subtitle.

13. The system of claim 12, wherein the processor executes program instructions stored on the computer-readable storage medium via the computer readable memory and thereby:
select an automatic speech recognition algorithm from a plurality of automatic speech recognition algorithms according to the liveness indicator and a policy; and
annotate the subtitle of the words spoken by the speaker, which decorates the subtitle of words spoken by the identified speaker with the text of spoken words according to the selected automatic speech recognition algorithm.

14. The system of claim 13, wherein the cues in the streaming video comprise a cue selected from a group consisting of: objects indicative of weather shown in video, noises indicative of weather in audio, objects identifying an event, objects identifying a location, facial recognition of persons present in video, statements of an event in audio, statements of a location in audio, statements of a time in audio, objects indicative of time present in video, objects indicative of speaker health in video, and audio indicative of speaker health; and
wherein external electronic sources comprise a source selected from a group consisting of: an electronic source of weather reported for a geographic location at current time, an electronic source of an event calendar, a known live electronic video feed from a geographic location, a known live electronic audio feed for a geographic location, an electronic source of health records for a speaker, an electronic source of reported news, an electronic source of a person's itinerary, and an electronic sources of social media.

15. A computer program product for subtitling streaming video with audio, the computer program product comprising:
a computer readable storage medium having computer readable program code embodied therewith, wherein the computer readable storage medium is not a transitory signal per se, the computer readable program code comprising instructions for execution by a processor that causes the processor to:
identify a speaker in a streaming video with audio according to words spoken by the speaker matched to a cognitive print, wherein the cognitive print comprises a plurality of traits classified according to a hierarchical long short term memory (LSTM) model, wherein the hierarchical LSTM model comprises a plurality of layers of LSTMs and each layer corresponds to the classification of one trait of the plurality of traits;
annotate a subtitle of the words spoken by the speaker, which decorates the subtitle with a label representative of the identified speaker; and
stream the decorated subtitle with the streaming video with audio.

16. The computer program product of claim 15, wherein the instructions for execution cause the processor to:
distinguish a plurality of speakers in the streaming video with audio, each according to corresponding words spoken by the speaker and a corresponding cognitive print, wherein the corresponding cognitive print differs for each speaker by at least one trait of the plurality of traits.

17. The computer program product of claim 15, wherein the plurality of traits comprises a trait selected from a group consisting of tone, stress, pitch, sentiment, social propensity, prosody, and accent.

18. The computer program product of claim 15, wherein the instructions for execution cause the processor to:
identify cues in the streaming video with audio, wherein the cues comprises indicators of a time and a location;
determine a liveness indicator for the streaming video with audio which indicates whether the streaming video with audio is streamed live by comparing the cues with external electronic sources; and
annotate the subtitle of the words spoken by the speaker, which includes the liveness indicator in the decorated subtitle.

19. The computer program product of claim 18, wherein the instructions for execution cause the processor to:
select an automatic speech recognition algorithm from a plurality of automatic speech recognition algorithms according to the liveness indicator and a policy; and
annotate the subtitle of the words spoken by the speaker, which decorates the subtitle of words spoken by the identified speaker with the text of spoken words according to the selected automatic speech recognition algorithm.

20. The computer program product of claim 18, wherein the instructions for execution cause the processor to:
wherein the cues in the streamed video comprise a cue selected from a group consisting of: objects indicative of weather shown in video, noises indicative of weather in audio, objects identifying an event, objects identifying a location, facial recognition of persons present in video, statements of an event in audio, statements of a location in audio, statements of a time in audio, objects indicative of time present in video, objects indicative of speaker health in video, and audio indicative of speaker health; and
wherein external electronic sources comprise a source selected from a group consisting of: an electronic source of weather reported for a geographic location at current time, an electronic source of an event calendar, a known live electronic video feed from a geographic location, a known live electronic audio feed for a geographic location, an electronic source of health records for a speaker, an electronic source of reported news, an electronic source of a person's itinerary, and an electronic sources of social media.

* * * * *